United States Patent
Swanson et al.

(10) Patent No.: US 9,229,903 B2
(45) Date of Patent: Jan. 5, 2016

(54) PROVIDING VEHICLE OPERATING INFORMATION USING A WIRELESS DEVICE

(75) Inventors: Steven Swanson, Commerce Township, MI (US); Lawrence D. Cepuran, Northville, MI (US); Mark S. Frye, Grosse Pointe Woods, MI (US); Charles A. Everhart, Canton, MI (US)

(73) Assignee: General Motors LLC, Detroit, MI (US)

( * ) Notice: Subject to any disclaimer, the term of this patent is extended or adjusted under 35 U.S.C. 154(b) by 5 days.

(21) Appl. No.: 13/600,350

(22) Filed: Aug. 31, 2012

(65) Prior Publication Data

US 2014/0067152 A1 Mar. 6, 2014

(51) Int. Cl.
| | |
|---|---|
| *G06F 17/00* | (2006.01) |
| *H04W 4/00* | (2009.01) |
| *G07C 5/00* | (2006.01) |
| *H04M 1/00* | (2006.01) |
| *H04M 3/00* | (2006.01) |
| *H04W 4/04* | (2009.01) |
| *H04W 24/00* | (2009.01) |
| *H04L 29/08* | (2006.01) |
| *H04W 4/18* | (2009.01) |
| *H04W 4/24* | (2009.01) |
| *H04W 88/04* | (2009.01) |
| *H04M 15/00* | (2006.01) |

(Continued)

(52) U.S. Cl.
CPC ............... *G06F 17/00* (2013.01); *G07C 5/008* (2013.01); *H04M 1/00* (2013.01); *H04M 3/00* (2013.01); *H04W 4/00* (2013.01); *H04W 4/008* (2013.01); *H04W 4/046* (2013.01); *H04W 24/00* (2013.01); *H04L 67/12* (2013.01); *H04L 67/2842* (2013.01); *H04M 1/06* (2013.01); *H04M 1/7253* (2013.01); *H04M 15/88* (2013.01); *H04W 4/18* (2013.01); *H04W 4/24* (2013.01); *H04W 88/04* (2013.01)

(58) Field of Classification Search
CPC ....... H04W 4/00; H04W 4/008; H04W 4/046; H04W 24/00; H04W 88/04; H04W 4/18; H04W 4/24; G06F 17/00; H04M 3/00; H04M 1/00; H04M 1/06; H04M 1/7253; H04M 15/88; G07C 5/008; H04L 67/2842; H04L 67/12

See application file for complete search history.

(56) References Cited

U.S. PATENT DOCUMENTS

| | | | | |
|---|---|---|---|---|
| 6,505,100 | B1 * | 1/2003 | Stuempfle et al. | 701/1 |
| 6,611,740 | B2 * | 8/2003 | Lowrey et al. | 701/29.4 |
| 8,285,439 | B2 * | 10/2012 | Hodges | 701/31.5 |

(Continued)

OTHER PUBLICATIONS

Ford-Life Document—Cryder, Alex. "How to Easily Pair an IPhone to Ford SYNC [Video]." Ford Life. Lebanon Ford, Jul. 18, 2012.*

(Continued)

*Primary Examiner* — John Q Nguyen
*Assistant Examiner* — Michael Kerrigan
(74) *Attorney, Agent, or Firm* — Anthony Luke Simon; Reising Ethington P.C.

(57) ABSTRACT

A method of collecting vehicle operating information using a wireless device includes the steps of communicatively linking a wireless device located within a vehicle to a vehicle telematics unit; receiving vehicle data at the wireless device from the vehicle telematics unit using the link; recording the received vehicle data at the wireless device; detecting that the wireless device is no longer present in the vehicle; and wirelessly transmitting the recorded vehicle data to a central facility using the wireless capabilities of the wireless device based on the detection.

18 Claims, 2 Drawing Sheets

(51) Int. Cl.
*H04M 1/06* (2006.01)
*H04M 1/725* (2006.01)

(56) References Cited

U.S. PATENT DOCUMENTS

| | | | |
|---|---|---|---|
| 8,370,020 B2* | 2/2013 | Bauman et al. | 701/33.2 |
| 8,526,930 B2* | 9/2013 | Watkins et al. | 455/418 |
| 2006/0155437 A1* | 7/2006 | Wang et al. | 701/29 |
| 2008/0316006 A1* | 12/2008 | Bauman et al. | 340/425.5 |
| 2009/0249323 A1* | 10/2009 | Nixon et al. | 717/173 |
| 2009/0284391 A1* | 11/2009 | Berkobin et al. | 340/870.01 |
| 2010/0136944 A1* | 6/2010 | Taylor et al. | 455/404.1 |
| 2010/0248695 A1* | 9/2010 | Cepuran | 455/414.1 |
| 2010/0248784 A1* | 9/2010 | Stolarz et al. | 455/559 |
| 2011/0118934 A1* | 5/2011 | Lowrey et al. | 701/33 |
| 2011/0281562 A1* | 11/2011 | Videtich | 455/414.1 |
| 2011/0316868 A1* | 12/2011 | Katou | 345/582 |
| 2012/0053759 A1* | 3/2012 | Lowrey et al. | 701/2 |
| 2012/0077457 A1* | 3/2012 | Howarter et al. | 455/404.2 |
| 2012/0094628 A1* | 4/2012 | Mader et al. | 455/404.1 |
| 2012/0142367 A1* | 6/2012 | Przybylski | 455/456.1 |
| 2012/0252364 A1* | 10/2012 | Inabathuni et al. | 455/41.2 |
| 2012/0252475 A1* | 10/2012 | Farrell et al. | 455/450 |
| 2013/0012179 A1* | 1/2013 | Watkins et al. | 455/418 |
| 2013/0124006 A1* | 5/2013 | Anantha et al. | 701/1 |
| 2013/0196621 A1* | 8/2013 | Guday et al. | 455/406 |
| 2013/0226369 A1* | 8/2013 | Yorio et al. | 701/1 |

OTHER PUBLICATIONS

Ford-Life Document—Cryder, Alex. "How to Setup Your Media Player Through Microsoft SYNC [Video]." Ford Life. Lebanon Ford, Jul. 18, 2012.*

Apple Support Document—Support. "iPhone Support, Wi-Fi, Joining a Network." Apple Support. Apple, Inc., Jul. 3, 2011. Web.*

* cited by examiner

PROVIDING VEHICLE OPERATING INFORMATION USING A WIRELESS DEVICE

TECHNICAL FIELD

The present invention relates to wireless communications and more particularly to providing vehicle operating information using a wireless device.

BACKGROUND

Nearly all new vehicles include some sort of ability to wirelessly communicate. These communications are usually carried out using a vehicle telematics unit carried by the vehicles. The vehicle telematics unit can place wireless voice calls that a vehicle occupant can use to speak with various recipients, such as a call center or other recipient using cellular telephony communications. The vehicle telematics unit can also place data calls to transmit data using cellular telephony communications; this data often relates to the operation of the vehicle. That is, the vehicle telematics unit not only can wirelessly communicate voice/data content but it can also gather information relating to vehicle operation and wirelessly send that information to a location away from the vehicle.

However, the vehicle telematics unit often uses a wireless carrier to send vehicle data and each time the vehicle telematics unit transmits data over the wireless carrier, fees are incurred. These fees can be calculated in a variety of ways, such as by the amount of data sent, the amount of time used to send data, or both. While transmitting data from the vehicle via the vehicle telematics unit is helpful for monitoring vehicle health, the cost of transmission can be significant—especially when these costs are spread out over a large number of vehicles. Thus, reducing the cost of wirelessly sending data can be helpful.

SUMMARY

According to an embodiment of the invention, there is provided a method of collecting vehicle operating information using a wireless device. The method includes the steps of communicatively linking a wireless device located within a vehicle to a vehicle telematics unit; receiving vehicle data at the wireless device from the vehicle telematics unit using the link; recording the received vehicle data at the wireless device; detecting that the wireless device is no longer present in the vehicle; and wirelessly transmitting the recorded vehicle data to a central facility using the wireless capabilities of the wireless device based on the detection.

According to another embodiment of the invention, there is provided a method of collecting vehicle operating information using a wireless device. The method includes communicatively linking a wireless device to a vehicle telematics unit via an in-vehicle hardware dock that connects to the wireless device; receiving vehicle data at the wireless device from the vehicle telematics unit using the in-vehicle hardware dock; storing the received vehicle data at the wireless device while the wireless device is physically connected with the in-vehicle hardware dock; determining that the wireless device has been removed from the in-vehicle hardware dock; and transmitting the stored vehicle data to a central facility using the wireless capabilities of the wireless device in response to the determination.

According to yet another embodiment of the invention, there is provided a method of collecting vehicle operating information using a wireless device. The method includes receiving an identity of a designated short-range wireless network access point from a telematics service subscriber; wirelessly linking a wireless device to a vehicle telematics unit via a short-range wireless protocol; receiving vehicle data at the wireless device from the vehicle telematics unit via the wireless link using the short-range wireless protocol; storing the received vehicle data at the wireless device while the wireless device is wirelessly linked to the vehicle telematics unit; detecting that the wireless device has begun wirelessly communicating with the designated short-range wireless network access point; and transmitting the stored vehicle data from the wireless device to a central facility.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The method described below involves collecting vehicle operating information (or vehicle data representing such information) from a vehicle using a handheld wireless device carried by a user and sending the vehicle operating information to a central facility. Presently, vehicle telematics units transmit vehicle operating information to the central facility, such as a call center or a back-office data repository. However, as discussed above, sending the vehicle operating information via the vehicle telematics unit using a wireless carrier system can involve significant cost. As a result, vehicle operating information may be gathered and/or sent more cost-effectively if done so using the handheld wireless device carried by a vehicle owner, user, telematics service subscriber or other similar person. That is, rather than using the wireless communication capabilities of the vehicle, the vehicle can detect the absence/presence of the handheld wireless device and when the wireless device is present in the vehicle, the handheld wireless device can receive vehicle operating information from the vehicle telematics unit carried by the vehicle. The handheld wireless device can then be directed to send the vehicle operating information to the central facility based on certain criteria. For example, the handheld wireless device can be directed to transmit the vehicle operating information to the central facility upon detecting the handheld wireless device has been removed from the vehicle. As part of the method described herein, the vehicle and/or the handheld wireless device can determine the arrival, departure, and/or presence of the handheld wireless device within the vehicle. Based on that determination, the vehicle can send vehicle operating information to the handheld wireless device for storage and leverage the communication capabilities of the handheld wireless device to transmit vehicle operating information to the central facility via the device.

Figure 1:
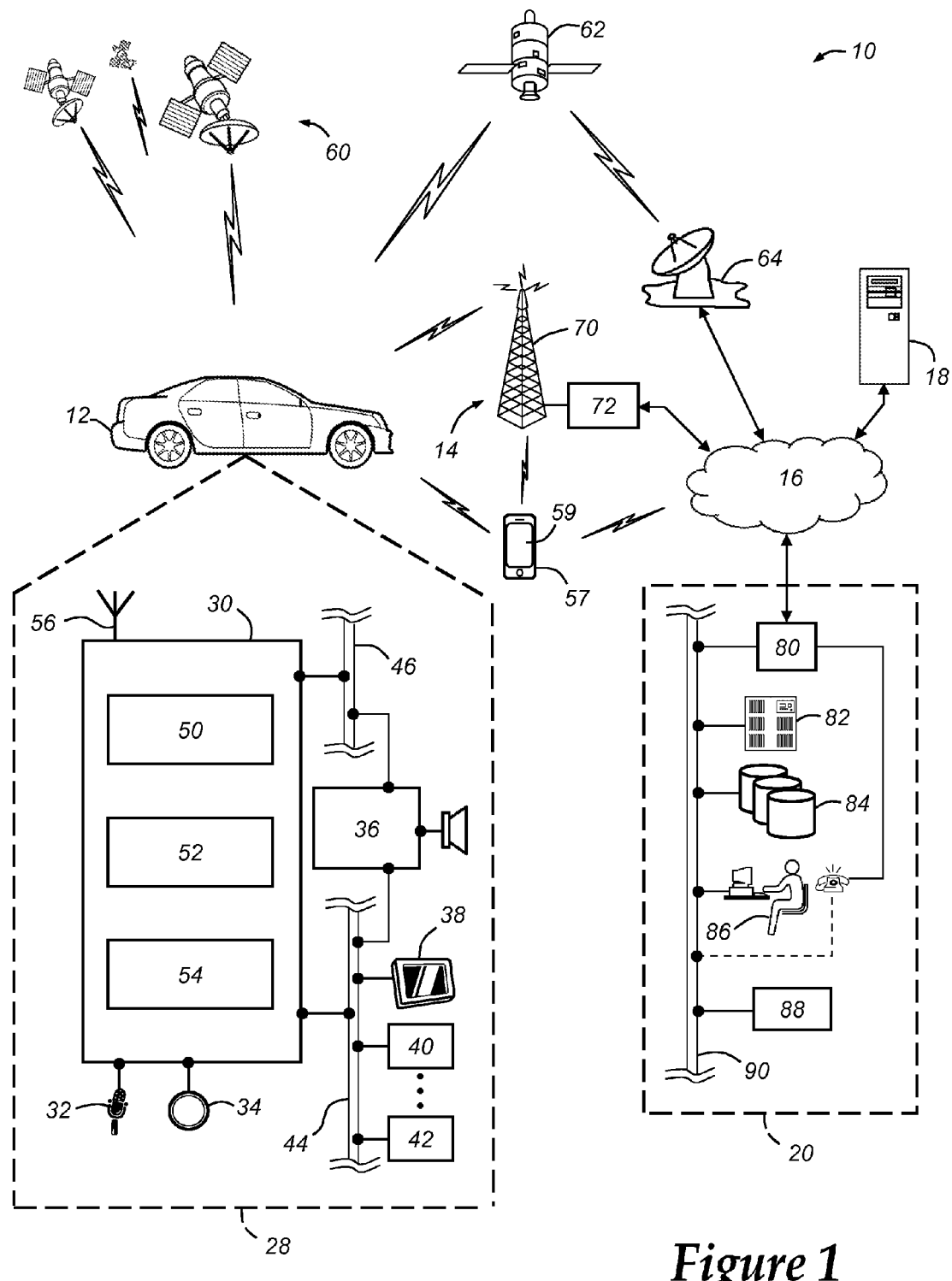
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth™. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a handheld wireless device 57, such as a smartphone or other similar wireless device. The handheld wireless device 57 can include computer processing capability, a transceiver capable of communicating using a short-range wireless protocol, and (optionally) a visual display 59. In some implementations, the handheld wireless device 57 also includes a touch-screen graphical user interface and/or a GPS module capable of receiving GPS satellite signals and generating GPS coordinates based on those signals. Examples of the handheld wireless device 57 include the iPhone™ manufactured by Apple, Inc. and the Droid™ manufactured by a number of producers, such as Motorola, Inc. While the handheld wireless device 57 may include the ability to communicate via cellular communications using the wireless carrier system 14, this is not always the case. For instance, Apple manufactures devices such as the iPad™, iPad 2™, and the iPod Touch™ that include the processing capability, the display 59, and the ability to communicate over a short-range wireless communication link. However, the iPod Touch and some iPads do not have cellular communication capabilities. Even so, these and other similar devices may be used or considered a type of handheld wireless device 57 for the purposes of the method described herein.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
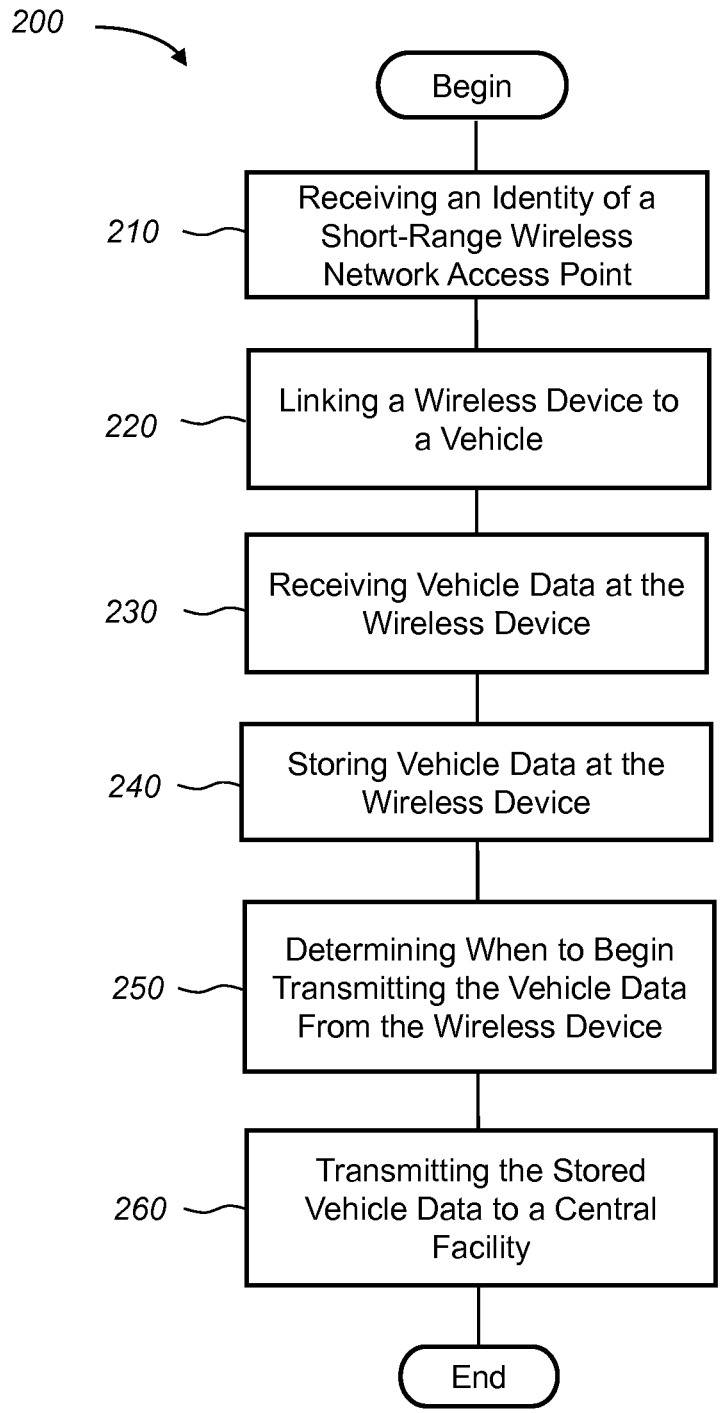
FIG. 2 is a block diagram depicting an embodiment of a method of collecting vehicle operating information using a wireless device.

Turning now to FIG. 2, there is shown a method 200 of collecting vehicle operating information using the handheld wireless device 57. The method 200 begins at step 210 by receiving an identity of a designated short-range wireless network access point from a telematics service subscriber. In some implementations, the vehicle owner, vehicle user, telematics service subscriber, or other similar person (used interchangeably herein) can identify one or more short-range wireless network access points (e.g., WLANs) that the subscriber comes into contact with. For example, the telematics service subscriber may park the vehicle 12 at a residence that provides a WLAN capable of providing wireless Internet access. Or the telematics service subscriber may regularly drive past and/or stop at a coffee shop that offers a WLAN providing wireless Internet access. By identifying one or more short-range wireless network access points, the telematics service subscriber can provide locations for sending vehicle operating information, which can act as triggers to send such information upon detecting the wireless network access points. This will be discussed in more detail below. The method 200 proceeds to step 220.

At step 220, the handheld wireless device 57 located within the vehicle 12 is communicatively linking to the vehicle telematics unit 30. This can be carried either wirelessly or via in-vehicle hardware that physically connects to the handheld wireless device 57. When wirelessly linking the handheld wireless device 57 to the vehicle telematics unit 30, one of many short-range wireless protocols can be used. For instance, the handheld wireless device 57 can wirelessly link with the vehicle telematics unit 30 using Bluetooth™ short-range wireless protocol as is known to those skilled in the art. Using Bluetooth™, the vehicle telematics unit 30 can send data, relating to vehicle operating information, to the handheld wireless device 57. The vehicle operating information (or vehicle data) can represent information that is continuously monitored on the vehicle 12, such as fuel level, odometer readings, and/or oil life to name but a few examples. The vehicle operating information can also include diagnostic trouble codes (DTCs) as well.

In another implementation, the handheld wireless device 57 can be communicatively linked to the vehicle telematics unit 30 via in-vehicle hardware, such as an in-vehicle dock or a wired connection in communication with the communications bus 44. For example, the in-vehicle hardware can comprise an in-vehicle dock that attaches to the interior of the vehicle 12 thereby physically supporting the handheld wireless device 57 while the device 57 is located within the vehicle 12 as well as communicatively linking the handheld wireless device 57 via hardwire to the vehicle telematics unit 30 via the communications bus 44. The in-vehicle dock may include a terminal end capable of physically and communicatively connecting with the handheld wireless device 57. Or in another implementation, the in-vehicle hardware can comprise a flexible wire communicatively linked to the communications bus 44 and including a terminal end capable of communicatively connecting with the handheld wireless device 57. The flexible wire may be hidden from view in a variety of places within the vehicle 12, such as in a glove compartment.

Regardless of whether the handheld wireless device 57 is linked to the vehicle 12 using a wireless link or in-vehicle hardware, the vehicle telematics unit 30 can detect the status of the link and make decisions based on that status. For instance, the vehicle telematics unit 30 can maintain a connection status and change that status upon detecting the absence or presence of the handheld wireless device 57. When the handheld wireless device 57 is connected to the vehicle telematics device 30 (either physically or wirelessly), the device 30 can set the connection status as "connected." In contrast, if the handheld wireless device 57 is removed from the vehicle 12 or disconnected (either physically or wirelessly) from the vehicle telematics unit 30, then the unit 30 can change the connection status to "disconnected." And the connection status and/or the change in connection status can be used to trigger transmissions from the handheld wireless device 57. This will be discussed in more detail further below. The method 200 proceeds to step 230.

At step 230, vehicle operating information is received at the handheld wireless device 57 from the vehicle telematics unit 30 via the link. Vehicle data representing the vehicle operating information can be gathered by the vehicle telematics unit 30 and sent to the handheld wireless device 57 via the communication link described above. In one example, the vehicle telematics unit 30 can determine the connection status of the handheld wireless device 57. If the connection status is "disconnected," then the vehicle telematics unit 30 can either not send vehicle data representing the vehicle operating information to the handheld wireless device 57 or store the vehicle data gathered during the "disconnected" state at the vehicle 12 for later transmission to the handheld wireless device 57. However, if the connection status is "connected," then the vehicle telematics unit 30 can access the stored vehicle data and/or one or more types of vehicle data continually-gathered at the vehicle 12 and transmit the vehicle data to the handheld wireless device 57 via the wireless link. That is, it is not only possible to send previously-gathered vehicle data but also to stream vehicle data to the handheld wireless device 57 as it is being gathered. In another implementation, the vehicle data that represents vehicle operating information can also be sent/received in a similar manner using the in-vehicle hardware dock. The method 200 proceeds to step 240.

At step 240, the received vehicle operating information is stored at the handheld wireless device 57 while the device 57 is linked to the vehicle telematics unit 30. After receiving the vehicle operating information sent during step 230, the handheld wireless device 57 may decide to maintain the received vehicle operating information for a period of time that can be defined by the connection status of the handheld wireless device 57. For instance, the handheld wireless device 57 can be instructed to store the received vehicle operating information as long as the connection status is defined as "connected." The handheld wireless device 57 can also be instructed to store the received vehicle data while the wireless device is physically connected with the in-vehicle hardware dock. The method 200 proceeds to step 250.

At step 250, it is determined when to begin sending the received/stored vehicle operating information from the handheld wireless device 57 to the central facility. This determination can be made in a number of ways. In one example, this can be determined when the handheld wireless device 57 begins wirelessly communicating with the designated short-range wireless network access point. For instance, when the handheld wireless device 57 establishes a short-range wireless connection with a wireless network access point, such as the type identified during step 210, then the vehicle telematics unit 30 or the handheld wireless device 57 can decide to send vehicle data representing vehicle operating information stored during step 240 can be sent to an appropriate central facility, such as the call center 20 or back office facility (e.g., computer 18). While it may be less expensive to use the cellular communications capabilities of the handheld wireless device 57 rather than those of the vehicle telematics unit 30, further cost savings may be realized by using the short-range wireless access point to send the stored vehicle data. By doing so, it is possible to avoid sending the vehicle data representing vehicle operating information using the wireless carrier 14.

In another example, the handheld wireless device 57 can decide to send the received/stored data by detecting that the device 57 is no longer present in the vehicle 12. For example, the handheld wireless device 57 can determine that the communication status has changed from "connected" to "disconnected." In that way, the handheld wireless device 57 may no longer be able communicate with the vehicle telematics unit 30 via the short-range wireless link and as a result the handheld wireless device 57 can determine that it has been removed from the vehicle 12. Similarly, the handheld wireless device 57 can detect that it has been physically detached from the in-vehicle hardware in the vehicle 12 and based on that detection begin sending vehicle data.

The handheld wireless device 57 can also be instructed to determine when to send the received/stored vehicle data based on a "rate table" that identifies the cost to transmit data via the wireless carrier system 14 at any time of day. For instance, a predetermined rate threshold can be established above which the handheld wireless device 57 will not transmit data. The predetermined rate threshold can be stored at the handheld wireless device 57, which can be instructed not to transmit vehicle data unless the cost at the particular time/day when the handheld wireless device 57 intends to send the vehicle data is below the predetermined threshold. If the cost for transmitting vehicle data falls below the predetermined threshold as indicated by the rate table, the handheld wireless device 57 can proceed to transmit the vehicle data as planned. However, if the cost for transmitting vehicle data lies above the predetermined threshold as indicated by the rate table, the handheld wireless device 57 can temporarily prevent transmission of the vehicle data and periodically compare the rate table with the current time/day until the cost for transmitting vehicle data falls below the threshold, at which time the handheld wireless device 57 can send the vehicle data as planned. The method 200 proceeds to step 260.

At step 260, the stored vehicle operating information is transmitted from the handheld wireless device 57 to the central facility, such as the call center 20 or computer 18. Vehicle data representing vehicle operating information can be wirelessly transmitted to the central facility using the wireless capabilities of the handheld wireless device 57. For example, the handheld wireless device 57 can transmit the vehicle data via its own ability to communicate via the wireless carrier system 14, such as via cell tower 70. Or in another example, the handheld wireless device 57 can transmit the vehicle data via the short-range wireless access points (e.g., land network 16; WLANs) described above using known transmission techniques. The vehicle operating information can be used to periodically generate electronic messages (e.g., email or SMS messages) that include vehicle diagnostic information. These electronic messages can be sent to a vehicle owner or vehicle telematics subscription subscriber on a periodic basis (e.g., weekly, monthly, etc.) depending on the preferences of the owner/subscriber. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of collecting vehicle operating information using a wireless device, comprising the steps of:
   (a) communicatively linking a wireless device located within a vehicle to a vehicle telematics unit;
   (b) receiving vehicle data at the wireless device from the vehicle telematics unit using the link;
   (c) recording the received vehicle data at the wireless device;
   (d) detecting that the wireless device is no longer present in the vehicle;
   (e) determining if a cost to transmit the recorded vehicle data to the central facility is above a predetermined rate threshold, and if so, temporarily preventing the wireless transmission of the recorded vehicle data; and
   (f) wirelessly transmitting the recorded vehicle data to a central facility using the wireless capabilities of the wireless device when the cost is at or below the predetermined rate threshold.

2. The method of claim 1, further comprising the step of determining a status of the link and deciding to transmit vehicle data based on the determined status.

3. The method of claim 2, wherein the status further comprises a setting of either "connected" or "disconnected".

4. The method of claim 2, further comprising the step of determining the status at the vehicle telematics unit.

5. The method of claim 2, further comprising the step of determining the status at the wireless device.

6. The method of claim 2, further comprising the step of using the status of the link or a change in the status of the link to determine when to wirelessly transmit the recorded vehicle data from the wireless device.

7. The method of claim 6, wherein the vehicle data is transmitted when the status of the link changes from "connected" to "disconnected".

8. A method of collecting vehicle operating information using a wireless device, comprising the steps of:
   (a) communicatively linking a wireless device to a vehicle telematics unit via an in-vehicle hardware dock that physically connects to the wireless device;
   (b) receiving vehicle data at the wireless device from the vehicle telematics unit using the in-vehicle hardware dock;
   (c) storing the received vehicle data at the wireless device while the wireless device is physically connected with the in-vehicle hardware dock;
   (d) determining that the wireless device has been disconnected from the in-vehicle hardware dock;
   (e) determining if a cost to transmit the stored vehicle data is above a predetermined rate threshold, and if so, temporarily preventing the wireless transmission of the stored vehicle data to the central facility; and
   (f) transmitting the stored vehicle data to a central facility using the wireless capabilities of the wireless device when the cost is at or below the predetermined rate threshold.

9. The method of claim 8, further comprising the step of determining at the vehicle telematics unit if the wireless device is communicatively linked to the in-vehicle hardware dock.

10. The method of claim 8, further comprising the step of determining at the wireless device if the wireless device is communicatively linked to the in-vehicle hardware dock.

11. A method of collecting vehicle operating information using a wireless device, comprising the steps of:
   (a) receiving an identity of a designated short-range wireless network access point at a wireless device from a telematics service subscriber;
   (b) wirelessly linking the wireless device to a vehicle telematics unit via a short-range wireless protocol;
   (c) receiving vehicle data at the wireless device from the vehicle telematics unit via the wireless link using the short-range wireless protocol;
   (d) storing the received vehicle data at the wireless device while the wireless device is wirelessly linked to the vehicle telematics unit;
   (e) detecting that the wireless device has begun wirelessly communicating with the designated short-range wireless network access point; and
   (f) transmitting the stored vehicle data from the wireless device to a central facility in response to step (e).

12. The method of claim 11, further comprising the step of determining a status of the wireless link between the vehicle telematics unit and the wireless device and deciding to transmit vehicle data based on the determined status.

13. The method of claim 12, further comprising the step of determining the status at the vehicle telematics unit.

14. The method of claim 12, further comprising the step of determining the status at the wireless device.

15. The method of claim 12, further comprising the step of using the status of the link or a change in the status of the link to determine when to wirelessly transmit the stored vehicle data from the wireless device to the central facility.

16. The method of claim 11, further comprising the step of transmitting the stored vehicle data from the wireless device to the central facility via the short-range wireless network access point based on a change in the status of the wireless link between the vehicle telematics unit and the wireless device.

17. The method of claim 11, further comprising the step of transmitting the stored vehicle data from the wireless device to the central facility via a wireless carrier system based on a change in the status of the wireless link between the vehicle telematics unit and the wireless device.

18. The method of claim 11, further comprising the step of determining if a cost to transmit the stored vehicle data is above a predetermined rate threshold, and if so, temporarily preventing the wireless transmission of vehicle data to the central facility.

* * * * *